United States Patent [19]

Schomann et al.

[11] Patent Number: 5,235,573
[45] Date of Patent: Aug. 10, 1993

[54] REPOSITIONING LASER BEAMS IN INFORMATION STORAGE MEDIA

[75] Inventors: Klaus D. Schomann, Ludwigshafen; Peter Hammerschmitt, Bruehl; Sibylle Brosius, Ludwigshafen; Kal-Heinz Feuerherd, Hettenleidelheim; Bernhard Albert, Maxdorf; Michael Schmitt, Weinheim; Michael Acker, Heidelberg, all of Fed. Rep. of Germany

[73] Assignee: BASF Aktiengesellschaft, Ludwigshafen, Fed. Rep. of Germany

[21] Appl. No.: 592,290

[22] Filed: Oct. 3, 1990

[30] Foreign Application Priority Data

Oct. 5, 1989 [DE] Fed. Rep. of Germany ....... 3933212

[51] Int. Cl.⁵ .............................................. G11B 7/085
[52] U.S. Cl. .................................... 369/32; 369/54; 358/342
[58] Field of Search .......................... 358/342; 360/75; 369/32, 54, 58, 106, 116, 44.28, 30

[56] References Cited

U.S. PATENT DOCUMENTS 4,660,189 4/1987 Tsukamura et al. ............ 369/116 X
5,050,015 9/1991 Hack et al. ............................ 360/75

Primary Examiner—W. R. Young
Attorney, Agent, or Firm—Keil & Weinkauf

[57] ABSTRACT

Moving laser beams from useful tracks to alternative positions in devices in which information is stored optically or magneto-optically. This results in higher signal-to-noise ratios.

9 Claims, 1 Drawing Sheet

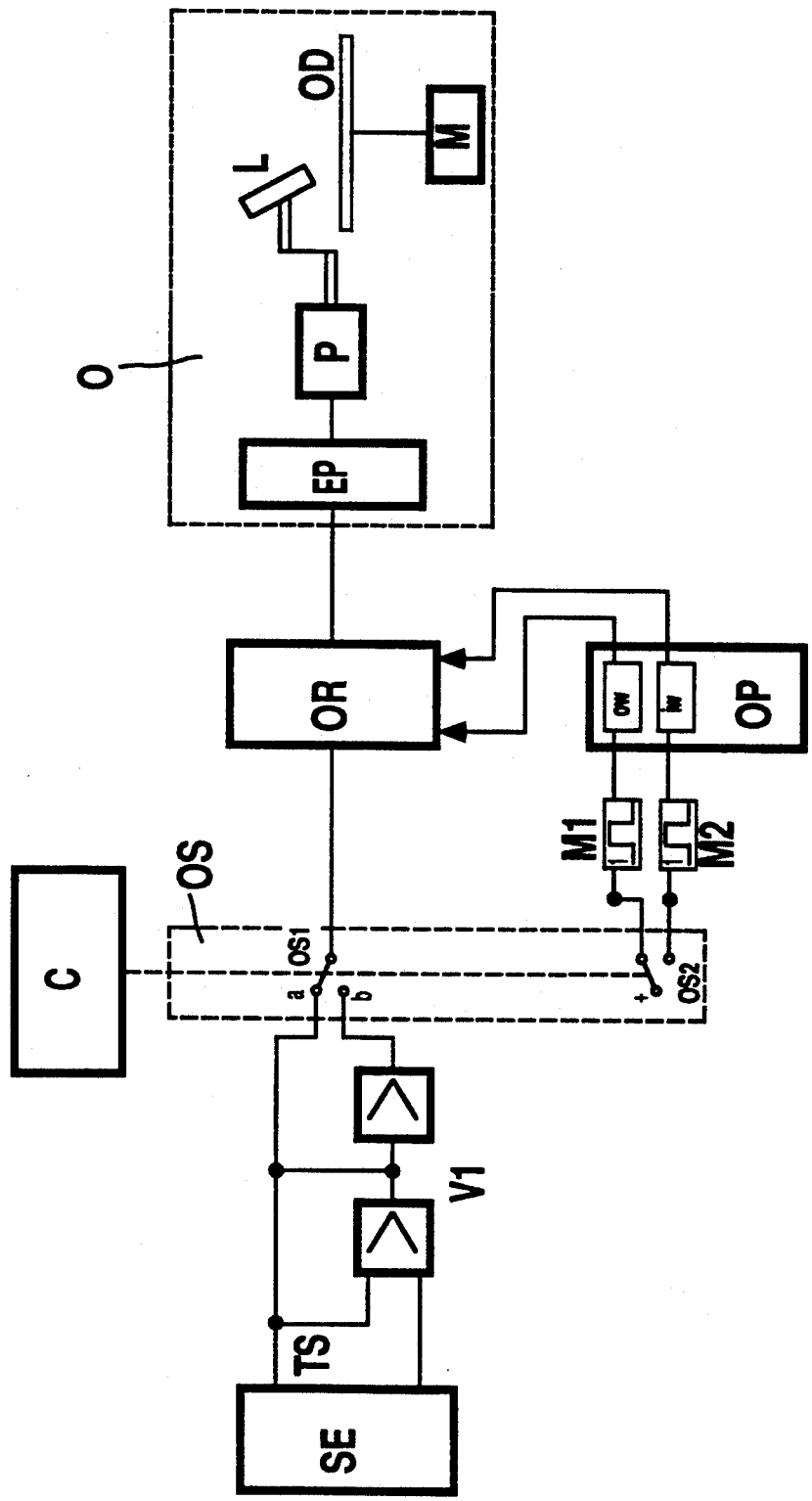

REPOSITIONING LASER BEAMS IN INFORMATION STORAGE MEDIA

BACKGROUND OF THE INVENTION

1. Field of the Invention

The present invention relates to methods and arrangements for avoiding scanning errors due to wear in an information storage means having at least one scanning means and at least one storage medium possessing a storage layer, write and read operations in the storage layer taking place in at least one useful track.

2. Description of the Prior Art

A antiwear system of this type for magnetic storage means has been the subject of an application by the same applicant (cf. U.S. Ser. No. 07/422,457 of Oct. 17, 1989, now U.S. Pat. No. 5,050,015).

In such magnetic disk stores, in particular having flexible media, the heads are moved on from the waiting tracks in accordance with the predetermined control scheme, possibly moved to alternative areas of the magnetic surface, when the heads have been on the same track for predetermined maximum waiting times, and then returned to the waiting position.

In all types of information stores, a high useful signal/noise signal ratio is desirable, i.e. also in laser-optical information stores in which the stored information can be read by means of a laser beam. The useful signal/noise signal ratio increases with increasing laser power.

In the latter, the upper limit of the permissible laser power is the laser power which, depending on the type of optical storage medium, leads to a change in, or destruction of, the stored information.

SUMMARY OF THE INVENTION

It is an object of the present invention to avoid scanning errors essentially due to wear and to avoid damage which reduces the life of the storage media.

The term "useful track (s)", as used herein, means a track or tracks for write/read purposes We have found that this object is achieved by a method for avoiding scanning errors due to wear in an information storage means having at least one scanning means and at least one storage medium possessing a storage layer, write and read processes in the storage layer taking place in at least one useful track and the scanning means being a laser beam means, which comprises reading the information from the useful track by means of a laser beam at a higher power level than that which just fails to alter the stored information if the laser beam remains focused on the same useful track for a time which is longer than the usual read time, the laser beam remaining focused, after reading of the information, on the useful track which has been read, moving of the focused laser beam on to an alternative track not intended as a useful track and repositioning on a useful track for a further write/read operation.

This prevents avoidable damage being caused by scanning means which are positioned for a relatively long time on the same useful track in moving storage media.

In a further embodiment of the novel method, the scanning means (the laser means) can be moved away to an area of the storage layer other than that of the useful track(s).

In another embodiment, moving away and repositioning may comprise one or more movements of the scanning means over the entire storage layer and back to the useful track or tracks.

Finally, it may also be advantageous for every information system if the other area of the storage layer is outside the usable area of the useful tracks.

In information stores which can be read by means of a laser beam, in particular optical information stores, in which the information is recorded and stored in at least one useful track on a storage medium, the object is achieved by a method in which the laser beam used for reading has a higher power than that which just fails to alter the stored information if the laser beam remains focused on the same useful track for a time which is longer than the usual read time, and in which, after the information of the useful track has been read, the laser beam remains focused on said useful track and is moved away to another alternative track without recorded information.

This ensures that the beam of a read laser which is focused for a relatively long time in the waiting position on one and the same track does not cause any change in, or destruction of, the recorded information if, taking into account the elevated temperatures within an optical information store, for example an optical store drive, where temperatures of about 50° C. or higher may occur, the laser power is sufficiently high to destroy or change the stored information.

The situation where the beam of the read laser remains focused on one and the same track for a relatively long time may occur during operation of information stores which are used, for example, for data storage, when the store drive is not accessed for a relatively long time. For optical stores, known measures for preventing change or destruction of information comprise switching off or defocusing the beam or positioning it on a special alternative track outside the storage area in which all useful tracks lie.

However, these measures have the disadvantage that they prolong the access time in the case of further access (a further write or read operation). After switching off or defocusing, refocusing requires time; in particular, however, the beam cannot be held on the track in the waiting time since tracking by conventional servo systems requires a focused beam. Due to disk eccentricity, the beam may be, for example, more than 100 tracks away from the original read track after the beam is switched on again, and it is impossible to predict which track it will lock onto again. Before further access, the new track address must therefore first be determined, which in turn takes time. To move the beam to an alternative track outside the storage area increases on average the distance through which the read beam has to be moved during the next access operation. Moving to the alternative track and positioning there also take time.

In this Example, the advantage of the method according to the invention is therefore that it is possible to use lasers having powers which are higher than those which just fail to alter the information if the laser, in particular the read laser, remains focused on one and the same useful track for a relatively long time, and that the abovementioned disadvantages are avoided.

In a further embodiment of the present method, if the information store is an optical disk drive and the disk has at least one groove and if the information is stored in at least one useful track alternatively either within the grooves or on the land in between, according to the invention the laser beam of the read laser should be moved to a land after the read operation, in particular one of the two nearest lands, if the useful tracks lie within the groove.

Land refers to the area between two grooves or between two adjacent parts of a single groove.

In a further embodiment of the method, the read laser can be moved on to the alternative track after a predetermined time in which no further write or read operation has been initiated. This time can also be predetermined and specified, for example in the case of a fixed access scheme.

In another practical embodiment of the method, the read laser can be moved on to an alternative track which is advantageously located in relation to the tracks to be read in the future.

An arrangement for carrying out the novel method for optical stores contains a conventional electronic control for the read laser positioner and comprises a switching means, a jump control stage and a servo control circuit, where, at a command signal from the electronic control, the switching means sends a control command via the jump control stage to the servo control circuit, which control command causes a changeover from the read track to an alternative track.

It is also possible to design the switching means to be resettable by means of a write/read command from the electronic control.

BRIEF DESCRIPTION OF THE DRAWINGS

Further details of the invention are described below with reference to an embodiment shown in the drawing.

The drawing shows a block diagram of an arrangement according to the invention for an optical storage means.

DESCRIPTION OF THE PREFERRED EMBODIMENTS

The function groups and signals which are already present in a commercial optical disk drive O are described here.

The disk OD is caused to rotate by the spindle motor M.

The positioner motor P moves not the head but the read laser scanning system L radially over the surface of the disk OD and onto a desired track, the scanning system L remaining a distance away from the surface of the disk OD.

The electronic control EP of the positioner controls the positioner motor P.

A servo detector SE, a jump control stage OP and a servo control circuit OR may be parts of the electronic control EP of the positioner here.

Signals for the beginning and end of the read operation and for moving on the read laser L are supplied by the controller or computer system C.

The read operation, to which the embodiment is restricted, takes place by means of the read laser scanning system L. The laser beam is regulated at the center of the track by means of the servo units SE and OR in conjunction with the electronic control EP. The jump control stage OP causes the scanning system L to jump in both radial directions over the surface of the disk OD.

The tracking control signal TS, which is supplied by the servo detector SE, passes through the amplifier V1 and is available as a normal signal at terminal a and as an inverted signal at terminal b. From terminal a, the signal TS passes via the switching means OS to the servo control circuit OR, which drives the drive O in such a way that the laser beam is kept, for example, on land or in groove.

After a first read operation in a first track on which the laser beam was, and still is, focused, according to the invention the changeover to the alternative mode should occur. For this purpose, a command signal is generated by the controller C, which more or less denotes the provisional end of the read operation and by means of which the switching means OS, consisting of the two individual switches OS1 and OS2, is simultaneously switched over. Switching of switch OS2 generates, via the downcircuit monoflop M1, a single switching signal which, via the jump control stage OP, triggers a single jump of the scanning system L in an outward (ow) direction, i.e. toward larger radii (in contrast, iw denotes inward, i.e. toward smaller radii).

By simultaneously switching of switch OS1, the inverted tracking control signal TS is simultaneously applied to the servo control circuit, with the result that the drive O, or more precisely the positioner P, is driven in such a way that the laser beam of the scanning system L is positioned in groove. In general, and assuming that the jump control stage OP triggers only one jump step, i.e. only to the next land or to the next groove, the result is therefore that the laser beam jumps radially outward to the next adjacent groove and is held there, fully focused.

This means that, if the information signals are recorded on the land track, there is a changeover to the groove track or vice versa after the read operation; if the information signals have been recorded in the groove track, there is a changeover to the land track after the read operation.

In summary, the sequence of steps is as follows: A normal read operation takes place, for example on the land between two groove sections, the high power laser beam being focused, the land track being scanned and read signals being generated.

At the end of the read operation, the high laser power remains switched on and the beam remains focused, but, at an appropriate command signal from the controller C, the tracking servo is switched over and hence the position of the read laser L is changed from the land track to the groove track, as an alternative track in the example chosen here, or vice versa.

At the next access, i.e. in the next read or write operation, an appropriate command signal from C causes switches OS1 and OS2 to be switched over. Consequently, a switching signal is generated via M2, which signal, via OP, triggers a single jump of laser beam inward (iw). By simultaneous switching of OS1, the noninverted tracking control signal (a) is again applied at OR, with the result that the positioner P is driven in such a way that the laser beam of L is again fixed on the land or, in technical terms, locked on.

If, on the other hand, the useful track read is located in the groove in the above example, the terms land and groove have to be interchanged in the above text.

Owing to this system, switching in such optical disk drives always takes place in the direction of smaller or larger radii but never alternately.

As a result, the particular position of the beam can be stored in the controller C and is available for the next access. In the intermediate time until then, the beam is located on an alternative area which carries no recorded information and therefore cannot alter any recorded data, so that a high laser power can be used.

In practice, a C/N ratio (carrier to noise ratio, i.e. ratio of carrier amplitude to noise amplitude) of 45 dB was measured for a laser having a read power of 0.8 mW. After the novel method was used, it was possible to increase the read power to 1.3 mW, with the result that the C/N ratio increased to 47 dB. The increase corresponds to an increase of 22% in the C/N ratio.

Advantageously, tracks or areas which are close by and do not contain recorded information or are not intended for recording are intended as alternative positions.

If access takes place, for example, in accordance with a predetermined track sequence scheme, the alternative track which is most advantageous in terms of space and time can be determined and stored in advance, on the basis of the particular track sequence.

It may then also be advantageous to switch to the alternative position in accordance with a fixed time schedule. It may also be advantageous, particularly in the case of undefined access, to switch automatically to the nearest alternative track after a predetermined maximum actual waiting time on the useful track.

The ideal waiting time and antiwear times or diversion times can be determined and fixed for an optical store from the usual points of view, as in the case of any information store.

The present invention is not tailored to certain information stores, nor is it restricted to a certain type of disk. For example, all disks for which the information can be read by means of lasers are suitable, i.e. all purely optical stores and also the magneto-optical stores in which the magnetic information in the tracks might be altered owing to the large amount of energy supplied by the laser beam.

We claim:

1. A method for increasing the signal-to-noise ratio in information storage means having at least one laser beam means as scanning means and at least one storage medium possessing a storage layer having useful tracks determined therefor, which method comprises (1) reading information from a useful track by focusing a laser beam means being a power which is higher than that which just fails to alter stored information, (2) after reading and after elapsing of a predetermined time during which no further read/write operation has been initiated, moving said focused laser beam means onto an alternative track, and (3) repositioning said laser beam means back onto the useful track when a further read/write operation is initiated.

2. A method as claimed in claim 1, wherein the information storage means is an optical disk drive and the storage medium comprises at least one optical disk which possesses at least one groove and land in between, the information in useful tracks being stored alternatively either within the groove or on said land in between.

3. A method as claimed in claim 1, wherein the information storage means is an optical disk drive and the storage medium comprises at least one optical disk which possesses at least one groove as a useful track and land in between parts of said groove as an alternative track.

4. A method as claimed in claim 3, wherein the storage medium comprises a plurality of concentric grooves as useful tracks and concentric lands in between the grooves as alternative tracks.

5. A method as claimed in claim 3, wherein the storage medium comprises a plurality of concentric grooves as useful tracks and nearest concentric lands thereof as alternative tracks.

6. A method as claimed in claim 1, wherein the information storage means is an optical disk drive and the storage medium comprises at least one optical disk which possesses at least one groove as an alternative track and land in between parts of said groove as a useful track.

7. A method as claimed in claim 6, wherein the storage medium comprises a plurality of concentric grooves as alternative tracks and concentric lands in between the grooves as useful tracks.

8. A method as claimed in claim 6, wherein the storage medium comprises a plurality of concentric lands in between a plurality of grooves as useful tracks and the nearest of said grooves as alternative tracks.

9. A method as claimed in claim 1, wherein the scanning means is moved to an alternative area of the storage layer other than that of the useful tracks.

* * * * *